(12) United States Patent
Khan et al.

(10) Patent No.: US 9,969,374 B2
(45) Date of Patent: May 15, 2018

(54) CONTROL AND DELIVERY OF HYDRAULIC FLUID IN VEHICLE BRAKING SYSTEM

(71) Applicant: FORD GLOBAL TECHNOLOGIES, LLC, Dearborn, MI (US)

(72) Inventors: Adil Khan, Windsor (CA); Steven Otis Pate, Royal Oak, MI (US); Peter Francis Worrel, Troy, MI (US); Clement Newman Sagan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 729 days.

(21) Appl. No.: 13/906,742

(22) Filed: May 31, 2013

(65) Prior Publication Data

US 2014/0354035 A1    Dec. 4, 2014

(51) Int. Cl.
*B60T 13/14*    (2006.01)
*B60T 13/58*    (2006.01)
(Continued)

(52) U.S. Cl.
CPC .............. *B60T 13/142* (2013.01); *B60T 8/38* (2013.01); *B60T 8/4872* (2013.01); *B60T 13/586* (2013.01); *B60T 2270/60* (2013.01)

(58) Field of Classification Search
CPC ........ B61H 11/005; B60S 9/12; B60T 13/141; B60T 17/22; B60T 11/206; B60T 8/38; B60T 8/4872; B60T 13/142; B60T 13/586; B60T 2270/60

USPC .......... 303/6.01, 9.61, 152, 9.72, 9.73, 9.74, 303/113.3, 113.4, 151, 155, 10; 60/585, 60/588

See application file for complete search history.

(56) References Cited

U.S. PATENT DOCUMENTS 3,870,377 A  *  3/1975  Belart .................. B60T 8/4004
                                                      188/181 A
6,176,556 B1     1/2001  Kizer
(Continued)

FOREIGN PATENT DOCUMENTS

CN        102310848 A     1/2012
CN        102481911 A     5/2012
CN        102529925 A     7/2012

*Primary Examiner* — Robert A. Siconolfi
*Assistant Examiner* — San M Aung
(74) *Attorney, Agent, or Firm* — David B. Kelley; Brooks Kushman P.C.

(57) ABSTRACT

A braking system in a hybrid vehicle is provided. The braking system includes a master cylinder having a first outlet, a second outlet, and a piston disposed therein and translatable from a proximal end to a distal end in response to brake pedal displacement. A brake fluid reservoir supplies hydraulic fluid to the master cylinder. A first fluid circuit connects the first outlet of the master cylinder to the brake fluid reservoir. A second fluid circuit connects the second outlet of the master cylinder to wheel brakes and supplies hydraulic fluid from the master cylinder to the wheel brakes in response to brake pedal displacement. The first outlet of the master cylinder is disposed between the second outlet and the proximal end of the master cylinder such that initial brake pedal displacement transfers brake fluid from the master cylinder to the fluid reservoir to inhibit hydraulic braking during regenerative braking.

19 Claims, 3 Drawing Sheets

(51) Int. Cl.
*B60T 8/38* (2006.01)
*B60T 8/48* (2006.01)

(56) References Cited

U.S. PATENT DOCUMENTS

| | | | |
|---|---|---|---|
| 6,217,127 B1* | 4/2001 | Kusano | B60T 7/042 |
| | | | 303/3 |
| 6,315,371 B1* | 11/2001 | Wachi | B60T 7/042 |
| | | | 303/11 |
| 9,233,676 B2 | 1/2016 | Ullrich et al. | |
| 2003/0085613 A1* | 5/2003 | Nakano | B60T 8/00 |
| | | | 303/114.1 |
| 2005/0121973 A1* | 6/2005 | Matsuno | B60T 8/4077 |
| | | | 303/114.1 |
| 2005/0162009 A1* | 7/2005 | Matsuno | B60T 8/4077 |
| | | | 303/113.4 |
| 2007/0176486 A1* | 8/2007 | Nakamura | B60K 6/365 |
| | | | 303/115.1 |
| 2008/0210497 A1 | 9/2008 | Jeon | |
| 2009/0026835 A1 | 1/2009 | Matsubara | |
| 2010/0191400 A1 | 7/2010 | Ajiro | |
| 2010/0244547 A1* | 9/2010 | Gilles | B60L 7/26 |
| | | | 303/3 |
| 2011/0115281 A1* | 5/2011 | Jeon | B60L 7/18 |
| | | | 303/3 |

\* cited by examiner

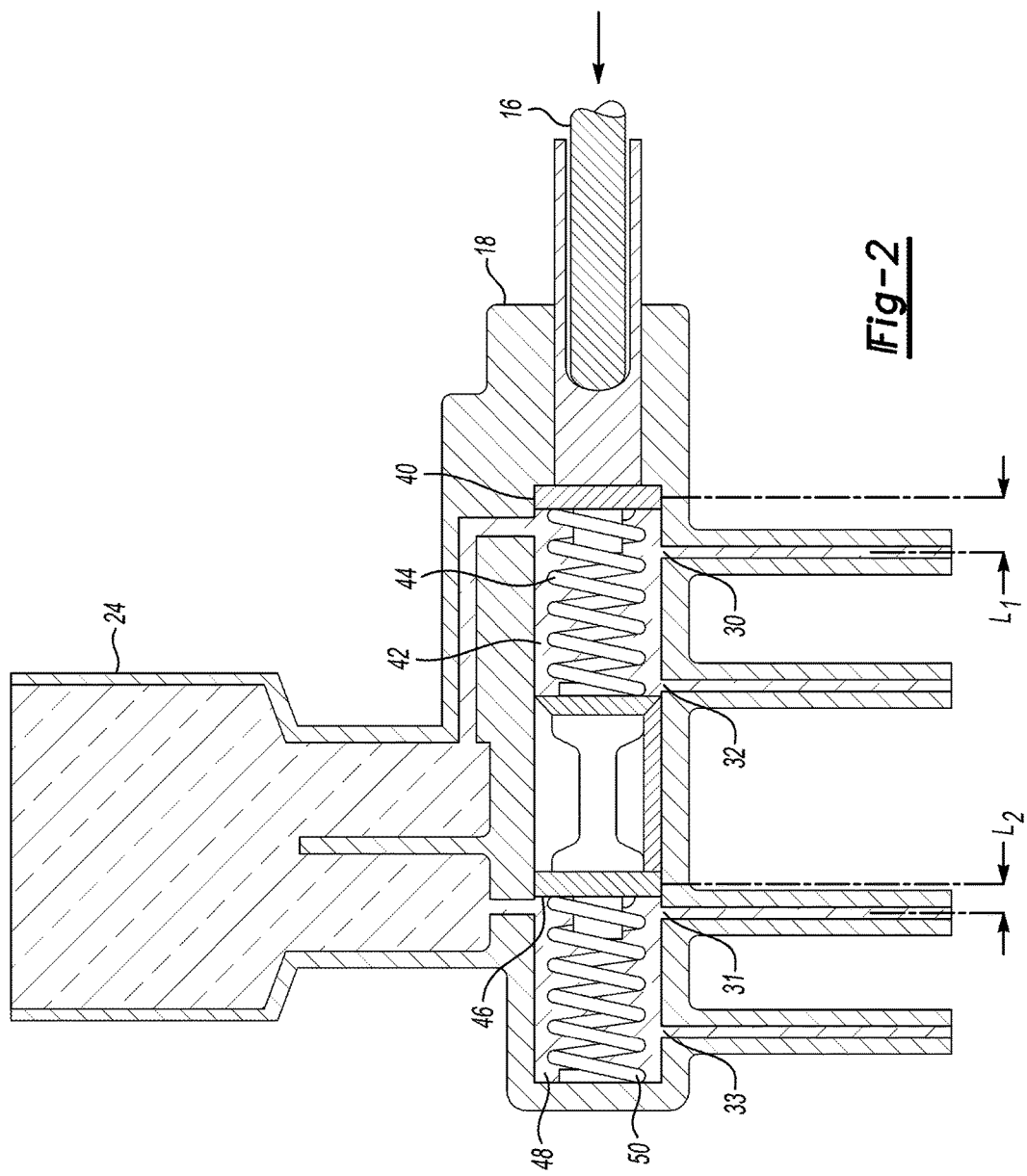

CONTROL AND DELIVERY OF HYDRAULIC FLUID IN VEHICLE BRAKING SYSTEM

TECHNICAL FIELD

The present disclosure generally relates to a braking system of a vehicle, and more specifically relates to a master cylinder and brake fluid displacement in a braking system of a vehicle.

BACKGROUND

Regenerative braking is known in the art for various vehicles such as, for example, hybrid electric vehicles (HEVs), plug-in hybrid electric vehicles (PHEVs), and battery electric vehicles (BEVs). During a regenerative braking event, an electric motor/generator converts rotational kinetic energy into electric energy that can be stored in a high voltage traction battery. Friction braking is also typically available in vehicles that are equipped with regenerative braking. A hydraulic braking system is known as one form of activating friction braking, in which pressurized brake fluid is transferred to the wheel brakes to apply friction to the wheels. A vacuum booster may also be provided in hydraulic braking systems to assist the translation of pedal movement into Circumstances may dictate that friction braking is utilized instead of regenerative braking. For example, if the state of charge in the high voltage traction battery is relatively high, vehicle controllers may disable regenerative braking and instead command friction braking in response to an operator of the vehicle depressing the brake pedal.

During a braking event, it may be beneficial to command regenerative braking only without hydraulic braking assist during initial movement of the brake pedal. For example, in U.S. Pat. No. 7,232,192 teaches a known deadband displacement range defined as a disconnection between connecting rods that connect the brake pedal to the hydraulic braking system. Brake pedal movement within the deadband displacement range results in activation of regenerative braking without activation of friction braking. While the deadband displacement range in a braking system is known in the art, it may not desirable in all vehicles.

SUMMARY

According to one embodiment, a braking system in a hybrid vehicle includes a brake pedal. A master cylinder has a proximal end and a spaced apart distal end to define a fluid chamber therebetween. First and second outlets are defined within the chamber of the master cylinder, and the second outlet is between the first outlet and the distal end. A piston is disposed within the master cylinder and translatable from the proximal end toward the distal end in response to brake pedal displacement. A brake fluid reservoir communicates fluid to the master cylinder. A first fluid circuit connects the first outlet of the master cylinder to the brake fluid reservoir. A second fluid circuit connects the second outlet of the master cylinder toward wheel brakes and supplies hydraulic fluid from the master cylinder to the wheel brakes in response to the piston being translated a length greater than a distance between the proximal end and the first outlet. Initial brake pedal displacement translates the piston between the proximal end and the first outlet and transfers brake fluid from the master cylinder to the fluid reservoir to inhibit hydraulic braking during regenerating braking.

According to one or more embodiments, a valve is disposed in the first fluid circuit. The valve is biased closed to block fluid from returning to the brake fluid reservoir via the first fluid circuit such that fluid is rather expelled into the second fluid circuit and toward the wheel brakes.

According to another embodiment, a hybrid vehicle includes a master cylinder having an associated brake fluid reservoir. A first fluid circuit fluidly connects the master cylinder to the brake fluid reservoir. In response to brake pedal movement during a braking event, the first fluid circuit delivers brake fluid from the master cylinder to the fluid reservoir rather than wheel brakes. A second fluid circuit is isolated from the first fluid circuit and fluidly connects the master cylinder to wheel brakes.

According to yet another embodiment, a hybrid vehicle includes a brake pedal and a master cylinder mechanically coupled to the brake pedal. The master cylinder has a first fluid circuit that selectively diverts hydraulic fluid from being supplied to vehicle brakes in response to an initial displacement of the brake pedal. The master cylinder also has a second fluid circuit that delivers hydraulic fluid to the vehicle brakes in response to brake pedal displacement beyond the initial displacement.

BRIEF DESCRIPTION OF THE DRAWINGS

FIG. 2 is a cross-sectional view of a tandem master cylinder in the braking system;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
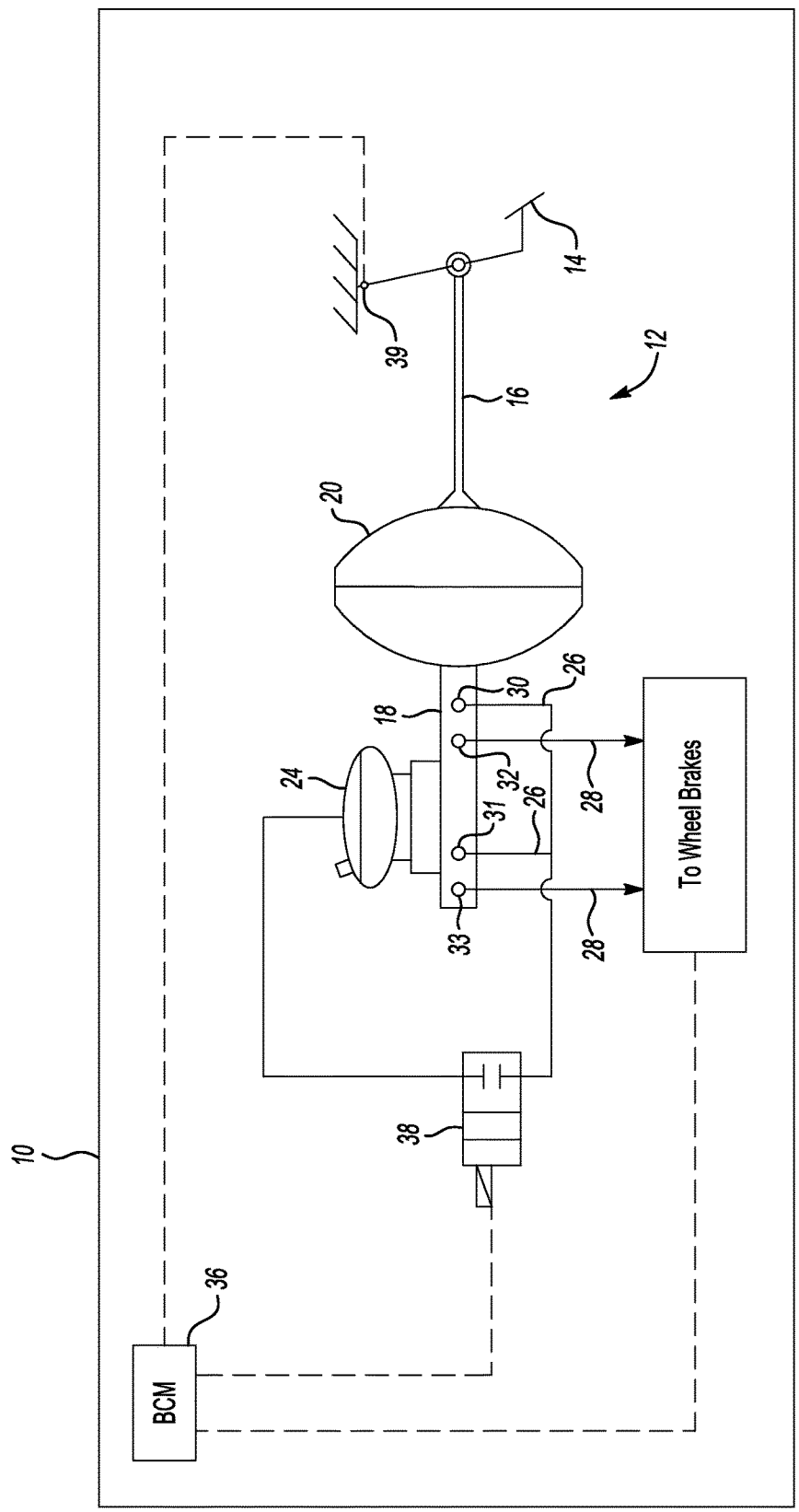
FIG. 1 is a schematic of a braking system according to at least one embodiment.

Referring to FIG. 1, a vehicle 10 is schematically illustrated according to one or more embodiments of the present disclosure. The vehicle 10 may be an HEV that includes an engine and an electric motor, each capable of providing propulsion force to the vehicle 10. The vehicle 10 may also be a BEV, in which a high voltage traction battery provides electric power to the electric motor to propel the vehicle without including an internal combustion engine. The vehicle 10 may also be a PHEV that includes an engine and a high voltage traction battery that can be connected to an external power source for charging the battery. Other vehicle configurations exist and are contemplated.

The vehicle 10 is capable of stopping due to regenerative braking and due to friction braking. During regenerative braking, kinetic energy is absorbed through the powertrain of the vehicle 10 and is stored as electric energy in a high voltage battery. During friction braking, pressure is applied at wheel brakes to provide friction on the wheels, and the vehicle's kinetic energy is converted into heat.

One example of friction braking in a vehicle 10 is a hydraulic braking system, illustrated as braking system 12. The braking system 12 receives brake demand from an operator depressing a brake pedal 14. Displacement of the brake pedal linearly translates a rod 16, such as a brake booster rod, that is operatively connected to a pair of pistons (not shown) within a tandem master cylinder (TMC) 18. A vacuum booster 20 may be provided to assist the movement of the rod 16 and therefore reduce the amount of pedal force required from the operator to move the piston within the TMC 18.

Hydraulic fluid or brake fluid is supplied to the TMC 18 from a fluid reservoir 24. During a braking event, the pistons in the TMC 18 expel fluid though a first fluid circuit 26 and/or a second fluid circuit 28. The first fluid circuit 26 fluidly connects one or more first outlets 30, 31 of the TMC 18 to the fluid reservoir. The second fluid circuit 28 fluidly connects the TMC 18 to the wheel brakes according to known fluid circuitry in a hydraulic braking system, in which fluid is pressurized and sent out of second outlets 32, 33 toward friction brakes. The first and second fluid circuits 26, 28 may be isolated from one another such that the fluid circuits do not share any of the same conduits or flow paths. Additional detail of the first and second fluid circuits 26, 28 will be further discussed below with reference to FIG. 2.

A brake control module (BCM) 36 is provided to control various aspects of the braking system 12. For example, the BCM 36 may operatively control a valve 38 disposed along the first fluid circuit 26 between the TMC 18 and the fluid reservoir 24. The BCM 36 includes one or more controllers that opens and closes the valve 38 based on signals received from various locations throughout the vehicle 10. The BCM 36 may operate the valve 38 based on, for example, signals received from a brake pedal position sensor 39 disposed at or near the brake pedal 14. Additional detail of the control of the valve 38 is provided with reference to FIG. 3. The BCM 36 may also be in communication with various valves and hardware within the hydraulic braking system, including the wheel brakes. The BCM 36 may additionally be in communication with other controllers throughout the vehicle, such as a vehicle system controller (VSC). References hereinafter to a "controller" are intended to refer to the BCM or any other controller in the vehicle capable of controlling actions within the braking system 12.

Referring to FIG. 2, additional details of the TMC 18 are illustrated. A brake booster output rod, or rod 16 functions as a first fluid pressurizer. The rod 16 receives force from the brake pedal 14 and linearly translates a primary piston 40 through a primary chamber 42 within the TMC 18. A primary spring 44 resists movement of the primary piston 40 such that the primary piston is biased towards its untranslated position as shown in FIG. 2. Similar to the primary piston 40, a secondary piston 46 pressurizes fluid within a secondary chamber 48. A secondary spring 50 resists movement of the secondary piston 46.

As previously illustrated in FIG. 1, second outlets 32, 33 are defined within the TMC 18 to provide a fluid flow path from the TMC 18 to the second fluid circuit 28. Fluid is supplied to the primary chamber 42 and secondary chamber 48 from the fluid reservoir 24. During a braking event, fluid in the primary chamber 42 and secondary chamber 48 is pressurized and supplied toward the wheels to actuate friction brakes.

In addition to friction braking or hydraulic braking, vehicles such as HEVs, BEVs and PHEVs may also include regenerative braking systems. Regenerative braking systems utilize a motor/generator to convert the kinetic energy of the vehicle into electric energy stored by a traction battery, whereupon the electric energy can later be used to, for example, propel the vehicle or power accessories in the vehicle.

In vehicles that include hydraulic braking and regenerative braking, it may be desirable to only provide regenerative braking during an initial range of brake pedal movement at the beginning of a braking event when brake demands are relatively low. One approach to accomplish this is to provide a deadband displacement range in which initial movement of the brake pedal does not always yield linear translation of the primary piston in the TMC. For example, a gap or space may be provided between the mechanical connection of rods between the brake pedal and the primary piston. The gap between the rods may be, for example, 10 mm in length. During the initial phase of a brake pedal stroke, regenerative braking is commanded until brake pedal movement linearly translates one rod through the gap and contact is made with an input rod to the TMC to actuate hydraulic braking.

According to various embodiments of the present disclosure, a braking system 12 is provided in which the necessity for a gap is eliminated while still allowing for regenerative braking during initial pedal movement while controllably inhibiting hydraulic braking.

Referring again to FIG. 2, first fluid outlets 30, 31 are defined within the fluid chambers 42, 48 of the TMC 18. The first fluid outlets 30, 31 fluidly connect the fluid chambers 42, 48, respectively, to the first fluid circuit 26.

Focusing on the primary chamber 42, during initial brake pedal movement at the beginning of a braking event, the input rod 16 linearly translates the primary piston 40. Movement of the primary piston 40 forces fluid in the primary chamber 42 through the first outlet 30 and into the first fluid circuit 26. At least some of the hydraulic fluid then recirculates back to the fluid reservoir 24 via the first fluid circuit 26 rather than actuating friction brakes via the second fluid circuit 28. Thus, initial brake pedal movement effectively transfers fluid from the TMC 18 to the fluid reservoir 24, and hydraulic braking is at least partially inhibited. This may occur throughout the initial brake pedal movement as the piston 40 travels an initial displacement distance $L_1$ defined as the distance between a proximal end of the chamber 42 and the first outlet 30. During this initial brake pedal movement, regenerative braking may be commanded by a controller to slow the vehicle.

After further depression of the brake pedal 14, the input rod 16 will force the primary piston 40 to travel the distance $L_1$ and pass the first outlet 30. Once the piston 40 passes over the first outlet 30, the first outlet 30 is blocked and fluid in the primary chamber 42 is no longer able to exit through the first outlet 30. Instead, the fluid in the primary chamber 42 is forced out of the second outlet 32 located near a distal end of the primary chamber, thus activating the hydraulic brakes.

As the TMC 18 includes two collinear pistons and chambers, the same or similar arrangement in the secondary chamber 48 may be made such that fluid in the secondary chamber 48 exits the first outlet 31 until the secondary piston 46 travels the initial displacement distance $L_2$ and passes the first outlet 31. The distance L2 may be different than L1 based on timing of the braking system 12.

Other configurations of multiple outlets 30, 32 within one chamber 42 are contemplated to divert fluid out of the chamber 42 without the fluid being sent to the wheel brakes. For example, the first outlet 30 may be defined anywhere within the primary chamber 42 and a controllable valve may be utilized in the first fluid circuit 26. In such an embodiment, when the valve is closed the first fluid circuit 26 is isolated from the primary chamber 42 such that fluid is forced into the second fluid circuit. In another contemplated embodiment, the first fluid outlet 30 is not provided, and rather fluid can travel into and out of the fluid reservoir 24 through one conduit or hole. It should be understood that yet other embodiments and arrangements are contemplated in which the hydraulic fluid is diverted or otherwise inhibited from being forced toward the wheel brakes during an initial brake pedal movement.

Referring to FIGS. 1 and 2, and as previously described, a valve 38 may be included along the first fluid circuit 26. The BCM 36 can be electrically connected to a solenoid to operatively open and close the valve 38. The valve 38 may be a normally-closed valve such that the valve 38 is biased or otherwise remained closed until commanded to be open by BCM 36. While the valve 38 is closed, fluid is blocked or inhibited from returning to the fluid reservoir 24 via the first fluid circuit 26, and thus translation of the pistons 40, 46 forces fluid through the second fluid circuit 28 and toward the wheel brakes. If the valve 38 is opened, the valve 38 acts as a bypass valve and allows fluid in the TMC 18 to be expelled from the TMC 18 while bypassing the second fluid circuit 28.

Due to the valve 38 being a normally-closed valve, if a loss of power or other break in communication between the controller and the valve 38 is present, the valve 38 will remain closed and friction braking will be commanded during the initial brake pedal movement. This provides significant benefits to an unbiased or uncontrollable valve in that in the event of a loss of the ability to operate the valve 38, the valve 38 will not remain open to continuously circulate fluid through the first fluid circuit 26 and into the fluid reservoir 24 if friction braking is in fact desired. Furthermore, if the valve 38 is stuck open, hydraulic braking will be assured once the pistons 40, 46 pass over their respective first outlets 30, 31.

Figure 3:
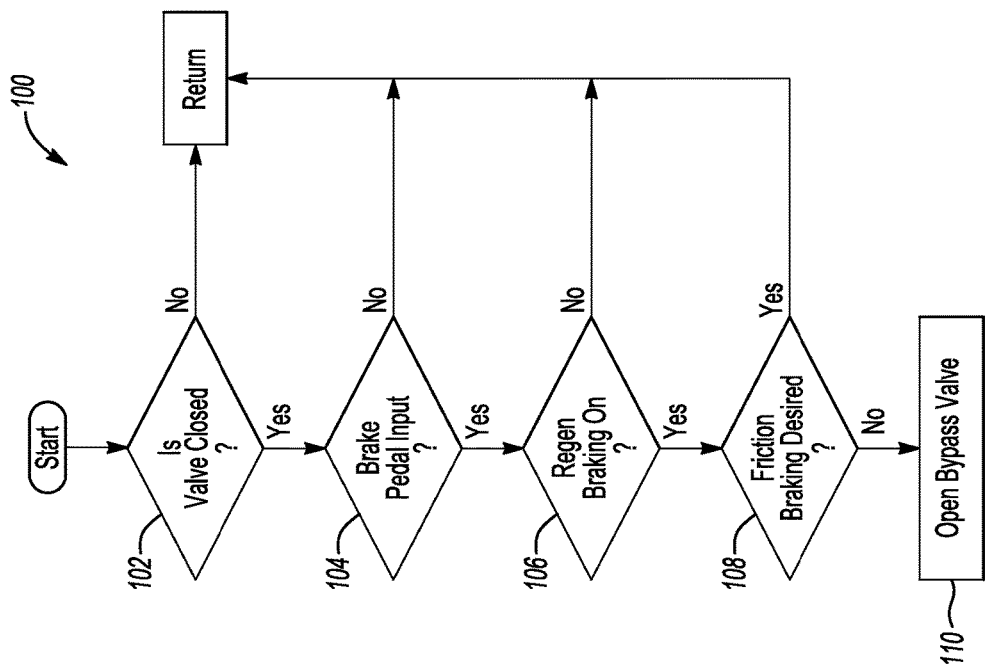
FIG. 3 is a flowchart illustrating an exemplary algorithm executed by a controller that controls the braking system.

Referring to FIG. 3, an exemplary embodiment of an algorithm 100 for controlling the valve 38 is illustrated. The algorithm 100 may be programmed into the BCM 36 or other controller in the vehicle 10. At operation 102, the controller determines whether the valve 38 is open or closed.

If the valve 38 is closed, then at operation 104 the controller determines whether there is a brake demand by the operator of the vehicle 10 greater than a threshold. This can be determined by a brake pedal position sensor, for example.

If there is a brake pedal demand, then at operation 106 the controller determines whether regenerative braking is active. This may be determined by communicating with other controllers in the vehicle 10, or by determining the energy flow through the motor/generator in the vehicle.

If regenerative braking is active, then at operation 108 the controller determines if friction or hydraulic braking is desired during the braking event. This may be determined by a plurality of factors. For example, if the state of charge of the traction battery within the vehicle 10 is above a predetermined threshold, regenerative braking may be disabled and friction braking may be commanded to prevent an overcharge of the battery. Similarly, regenerative braking may be disabled and friction braking may be commanded in response to brake pedal position indicating a brake demand. Other factors are contemplated to enable the controller to determine if friction braking is desired to replace or supplement regenerative braking during a braking event, as is apparent to one of ordinary skill in the art. If no friction braking is desired at 108, then the controller commands the valve 38 to close at 110.

Figure 4:
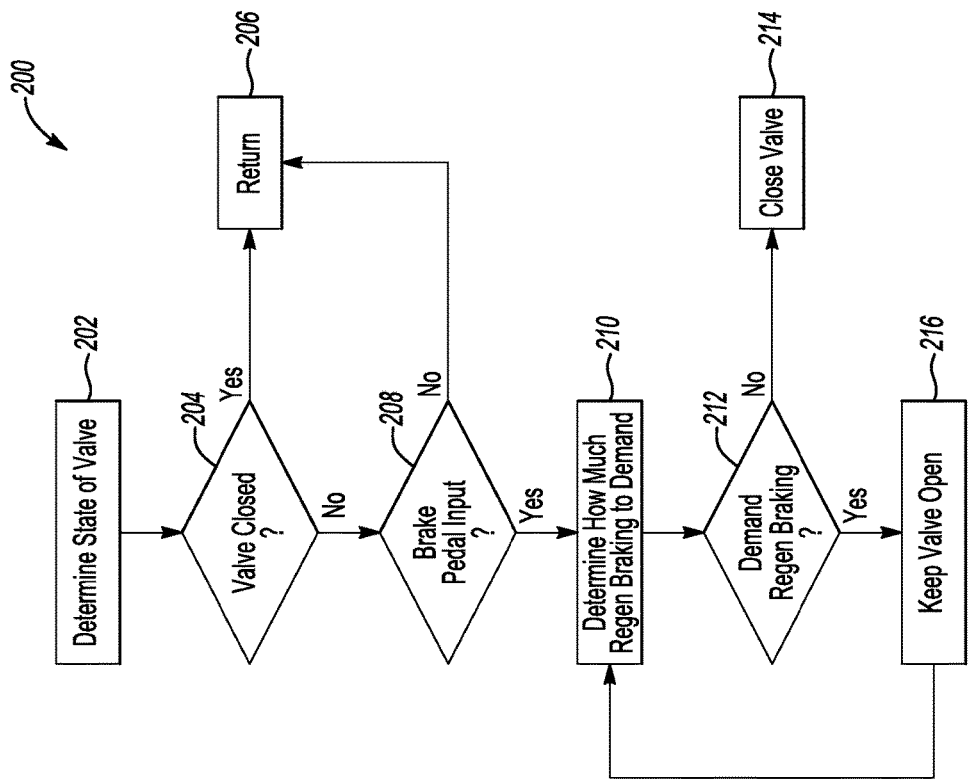
FIG. 4 is a flowchart illustrating another exemplary algorithm executed by the controller that controls the braking system.

Referring to FIG. 4, another exemplary embodiment of an algorithm 200 for controlling the valve 38 is illustrated. At operation 202, the algorithm begins by determining whether the valve 38 is open or closed. At operation 204, if it is determined that the valve 38 is closed, the method returns at operation 206.

If the valve 38 is open, the controller determines whether there is a brake pedal input indicating a braking event demanded by the operator at operation 208. At operation 210, the controller determines how much regenerative braking is necessary proportional to the total braking force desired, according to methods previously described. At operation 212, the controller determines if there is regenerative braking demanded at all. If there is no regenerative braking, the entire braking demand is fulfilled by hydraulic brakes and the valve 38 is closed at operation 214. If, however, regenerative braking is desired, the valve may be kept open at operation 216, and the method returns to operation 210 to continuously check for the amount of regenerative braking desired.

According to one or more embodiments of the present disclosure described above, it should be understood that modifications to the structure may be made for various benefits, such as reduction of parts. For example, while references have been made to fluid circuits, it should be understood that a fluid conduit can be used, or a direct connection without a fluid conduit. Other such modifications may be made according to one of ordinary skill in the art without departing from the scope of the present disclosure.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A braking system in a hybrid vehicle, comprising:
a brake pedal;
a master cylinder having a proximal end and a distal end of a fluid chamber, the master cylinder further having a first outlet, a second outlet between the first outlet and the distal end, and a piston disposed therein and translatable from the proximal end toward the distal end in response to brake pedal displacement;
a brake fluid reservoir;
a first fluid circuit connecting the first outlet of the master cylinder to the brake fluid reservoir; and
a second fluid circuit connecting the second outlet of the master cylinder to wheel brakes and supplying brake fluid from the master cylinder to the wheel brakes in response to the piston being translated a length greater than a distance between the proximal end and the first outlet;
wherein initial brake pedal displacement translates the piston between the proximal end and the first outlet and transfers brake fluid from the master cylinder to the fluid reservoir in the first fluid circuit to inhibit hydraulic braking during regenerative braking, and wherein brake fluid is inhibited from transferring from the master cylinder to the fluid reservoir in response to the piston translating past the first outlet to enable hydraulic braking.

2. The braking system of claim 1, further comprising a valve disposed in the first fluid circuit, wherein the valve is biased closed to block fluid return to the brake fluid reservoir.

3. The braking system of claim 2, further comprising at least one controller programmed to open the valve in response to a state of charge of a traction battery.

4. The braking system of claim 2, further comprising at least one controller programmed to open the valve in response to brake pedal position.

5. The braking system of claim 1, wherein the first and second fluid circuits are isolated from one another.

6. The braking system of claim 1, wherein the master cylinder includes a second fluid chamber having a proximal end, a distal end, and a second piston disposed therein, wherein the second fluid chamber defines a third fluid circuit connecting the a third outlet of the second fluid chamber to the fluid reservoir and a fourth fluid circuit connecting a fourth outlet of the second fluid chamber to the wheel brakes.

7. The braking system of claim 6, wherein a first distance is defined between the proximal end of the first chamber and the first outlet, a second distance is defined between the proximal end of the second chamber and the third outlet, wherein the first distance and the second distance are unequal.

8. A hybrid vehicle comprising:
a brake pedal;
a master cylinder mechanically coupled to the brake pedal and having a piston therein, a first fluid circuit that selectively diverts hydraulic fluid from being supplied to vehicle brakes in response to an initial displacement of the piston, and a second fluid circuit that delivers hydraulic fluid to the vehicle brakes in response to displacement of the piston beyond a fixed initial displacement distance.

9. The hybrid vehicle of claim 8, further comprising a controller programmed to apply a regenerative braking force to vehicle wheels while the piston has translated a distance less than the fixed initial displacement distance.

10. The hybrid vehicle of claim 9, further comprising a valve communicatively coupled to the controller, wherein the controller is programmed to close the valve and inhibit flow of hydraulic fluid in the first fluid circuit in response to a request for an increase of frictional braking force and a decrease in regenerative braking force.

11. The hybrid vehicle of claim 10, wherein the valve is a normally-closed valve.

12. The hybrid vehicle of claim 10, wherein the controller is further programmed to operate the valve in response to traction battery state of charge.

13. The hybrid vehicle of claim 8, wherein the first fluid circuit is isolated from the second fluid circuit.

14. A vehicle comprising:
a master cylinder having a chamber with a piston slidably disposed therein and biased toward a proximal end, the chamber defining a first opening fluidly coupling the chamber to a fluid reservoir and located a distance from the proximal end, and a second opening fluidly coupling the chamber to hydraulic-brakes;
wherein fluid is inhibited from transferring through the first opening in response to the piston moving the distance from the proximal end.

15. The vehicle of claim 14, wherein fluid is inhibited from transferring through the second opening based on the piston being located between the proximal end and the first opening, and wherein fluid is enabled to transfer through the second opening in response to the piston moving the distance from the proximal end.

16. The vehicle of claim 14, further comprising at least one controller communicatively coupled to a valve disposed between the first opening and the fluid reservoir, the at least one controller programmed to close the valve in response to a request for an increase in frictional braking force and a decrease in regenerative braking force.

17. The hybrid vehicle of claim 14, further comprising a valve disposed within the first fluid circuit to selectively disable fluid flow from the master cylinder to the brake fluid reservoir via the first fluid circuit.

18. The hybrid vehicle of claim 17, further comprising at least one controller programmed to open the valve in response to a traction battery state of charge.

19. The hybrid vehicle of claim 17, further comprising at least one controller programmed to open the valve in response to brake pedal position.

* * * * *